United States Patent
Galinski

(10) Patent No.: US 8,514,661 B2
(45) Date of Patent: Aug. 20, 2013

(54) TRANSDUCER

(75) Inventor: Udo Galinski, Porta Westfalica (DE)

(73) Assignee: KG transmitter components GmbH, Bad Oeynhausen (DE)

( * ) Notice: Subject to any disclaimer, the term of this patent is extended or adjusted under 35 U.S.C. 154(b) by 669 days.

(21) Appl. No.: 12/618,908

(22) Filed: Nov. 16, 2009

(65) Prior Publication Data

US 2010/0158082 A1    Jun. 24, 2010

(30) Foreign Application Priority Data

Nov. 14, 2008 (DE) .................. 10 2008 057 474

(51) Int. Cl.
*H04B 1/06* (2006.01)

(52) U.S. Cl.
USPC .......................................... 367/135; 367/140

(58) Field of Classification Search
USPC .......................................... 367/135, 137, 140
See application file for complete search history.

(56) References Cited

U.S. PATENT DOCUMENTS

| | | | | |
|---|---|---|---|---|
| 3,864,966 A | * | 2/1975 | Seitz | 73/862.623 |
| 4,413,259 A | * | 11/1983 | Lutz et al. | 340/3.61 |
| 4,783,659 A | | 11/1988 | Frick | |
| 5,083,091 A | | 1/1992 | Frick et al. | |
| 5,777,223 A | | 7/1998 | Kohrt | |
| 5,949,994 A | * | 9/1999 | Dupree et al. | 712/228 |
| 5,995,885 A | | 11/1999 | Pfeufer et al. | |
| 6,043,768 A | | 3/2000 | Strasser et al. | |
| 6,480,131 B1 | | 11/2002 | Roper et al. | |
| 6,674,384 B2 | | 1/2004 | Vialette | |
| 6,853,237 B2 | | 2/2005 | Murakami et al. | |
| 6,867,581 B1 | | 3/2005 | Bendicks et al. | |
| 7,496,458 B2 | | 2/2009 | Walter et al. | |

FOREIGN PATENT DOCUMENTS

| | | |
|---|---|---|
| DE | 195 20 299 A1 | 12/1996 |
| DE | 40 16 922 C3 | 5/1998 |
| DE | 198 55 358 A1 | 6/2000 |
| EP | 0 328 520 B1 | 6/1999 |
| JP | 2008-116339 A | 5/2008 |

* cited by examiner

*Primary Examiner* — Ian Lobo
(74) *Attorney, Agent, or Firm* — Roberts Mlotkowski Safran & Cole, P.C.; David S. Safran

(57) ABSTRACT

A transducer for converting an input signal fed to a first input (2) into a corresponding electric output signal that is output via an output (3). The input signal can be processed via an analog transmission path (4) into an analog converter signal. The transducer allows for a quick conversion of the input signal into a corresponding output signal having a high accuracy and suitable for applications having increased safety requirements, wherein the input signal can be additionally processed via a separate digital transmission path (5) into a digital converter signal. The analog converter signal and the digital converter signal are evaluated by an evaluation unit (6) and the evaluation unit (6) generates the electric output signal based on the analog converter signal or the digital converter signal.

6 Claims, 2 Drawing Sheets

TRANSDUCER

BACKGROUND OF THE INVENTION

1. Field of Invention

The invention relates to a transducer for converting at least one input signal fed to a first input into a corresponding electric output signal, which can be output via at least one first output, wherein the input signal can be processed via an analog transmission path into an analog transducer signal.

2. Description of Related Art

Transducers for generating analog transducer signals have been known for a long time and serve the purpose of detecting a sensor signal as an input signal coming from a sensor element and converting the detected signal into a normally standardized signal as electric output signal, so that the output signal, for example, can be used by higher-level process control.

The term transducer is not to be understood as limiting in any way. For example, the physical variables of the signal input to and the signal output from the transducer can be the same or can be different. Typically, however, the input signal also is an electric signal. Although the electric input signal can be actively provided by a sensor element connected at an input of the transducer, the connected sensor element also can be fed with energy from the transducer, so that the actual electric input signal results through such interaction. It is common for transducers to have the output designed as a current interface, in which the dimensions of the detected measured value to be transmitted are encoded by currents ranging from 4 mA to 20 mA, and the like. This is particularly common in so-called two-wire devices that receive their energy supply via such a current interface.

If it is said that the sensor-side input signal can be processed into an analog converter signal via an "analog transmission path," then a circuit-type implementation of the transmission path is kept in an analog form, in which the conversion of the input signal to the analog converter signal is done without temporal and/or value-based quantized intermediate steps in the sense of digital technology. Such circuit-type implementation can occur in a discrete as well as integrated form. As an analog transmission path, such circuits are taken into consideration, which have digital components in terms of circuit technology. However, such digital components are not switched intermediately to the analog transmission path of the input signal into an analog converter signal, but rather serve, for example, only to parameterize the analog circuit. Such purely analog implemented transmission paths in this sense have the advantage that they are very fast due to the technology used, wherein the analog converter signal follows the varying input signal practically without delay.

Transducers may also have a digital transmission path in place of an analog transmission path, in which the input signal is converted in terms of circuits into a digital converter signal using digital means (i.e., using temporal and/or value-based quantization). Usually simple microcontrollers are used for implementation of such digital transmission paths, which already have the required functional abilities and interfaces for signal processing, for example, such as multiplexers, digital/analog converters, analog/digital converters, programmable boosters, programmable current outputs, serial interfaces, and the like.

The reaction times of digitally implemented transducers or of transducers having a digital transmission path are exceptionally large compared to the reaction times of analog transmission paths. For example, the reaction times of such transducers can be much greater than the maximum permitted dead times in security related applications, in particular when detecting quickly-changing process variables. The advantage of transducers having digital transmission paths is that a considerably higher accuracy in converting the input signal into a converter signal can be achieved using such circuits than is possible in the implementation of the transmission path with analog circuit technology.

Regardless of which type of transducer is used to solve a measuring task, it is required in security related applications to provide redundant back-up systems. Such redundancies are then normally produced using multiple parallel transducers, which results in relatively higher costs, a technically elaborate design, and which does not resolve the conflict between analog or digitally implemented circuit variations.

SUMMARY OF THE INVENTION

Thus, in view of the foregoing, an object of the present invention is to provide a transducer that allows a quick conversion of an input signal into a corresponding output signal with high accuracy and that also is preferably suitable for applications having increased safety requirements.

The object derived and described above is met by a transducer of the above-mentioned type according to the invention in that an input signal can be additionally processed via a separate digital transmission path into a digital converter signal, wherein an analog converter signal and the digital converter signal are evaluated by an evaluation unit and the evaluation unit generates an electric output signal either based on the analog converter signal or based on the digital converter signal. This implies that the input signal impinges on the analog transmission path and the digital transmission path at the same time and simultaneously creates the respective converter signal corresponding with the input signal.

The transducer designed according to the invention is exceptionally advantageous in many respects. For example, redundancy for safety related applications, and the like, is provided by using a single transducer with an analog transmission path and a separate digital transmission path, which can be simultaneously used to process an input signal. Accordingly, a redundant transmission path is not merely provided in the transducer, but rather two transmission paths implemented using respective analog and digital technologies are provided to operate in parallel to one another. With such a diverse construction, advantageously, systematic errors that otherwise would not be eliminated even using a redundant arrangement, can essentially be detected and avoided with the arrangement according to the invention. In the transducer according to the invention, not only the result of one transmission path is taken into account in correcting the result of the other transmission paths, but also the analog converter signal as well as the digital converter signal are evaluated by an evaluation unit and the output signal is then generated either based on the analog converter signal or based on the digital converter signal. Using a novel design of the evaluation unit, it is then possible, as will be further described, to use the advantages of the diversely employed technologies in the transmission paths, and to reduce or completely eliminate the disadvantages of the diversely employed technologies.

In the context of the invention, if the evaluation unit "generates" an electric output signal, such output signal need not be created using energy from the evaluation unit, but rather can include a switching between the analog converter signal and the digital converter signal, if the signals received by the evaluation unit are suitable for such switching.

According to an exemplary embodiment of the invention, the evaluation unit determines a comparison value by comparing the analog converter signal with the digital converter signal and when a first comparison threshold value is exceeded by the comparison value, the evaluation unit generates the electric output signal using the analog converter signal. Such a novel design of the transducer according to the invention takes into account the fact that the analog converter signal clearly more promptly follows the supplied input signal than the digital converter signal and, thus, assuming overall proper function of the transducer, a comparison value with a deviation of zero, which is normally given through the difference or the difference amount of analog converter signal and digital converter signal, is based on different quick successions of the compared converter signals. In such cases, despite the fact that the analog converter signal maybe less accurate overall than the digital converter signal, the analog converter signal is a better image of the input signal than the digital converter signal and, thus, forms the basis for generating the electric output signal.

A difference between the analog converter signal coming from the analog transmission path and the electric output signal can exist, for example, in that the analog converter signal has not yet been matched or standardized. Using the analog transmission path, the measuring range can, for example, be mapped in an analog converter signal in the voltage range of 1 V to 2 V DC and the electric output signal can, for example, be a standardized current signal, which maps the value range of the transducer in a current in the range from 4 mA to 20 mA. In this case, a voltage-current-converter is provided between the analog transmission path and the first output.

In an exemplary embodiment of the invention, the comparison value is not a constant value, but rather is a function of the analog converter signal, for example, a fixed part of the analog converter signal. If, for example, the measuring inaccuracies in the analog converter signal are at one percent in relation to the measured value, then it makes sense to choose a comparison threshold value, as function of the value of the analog converter signal, for example, in the range of such an error or even larger than the error, and the like.

In the context of the invention, the evaluation unit "compares" the analog converter signal with the digital converter signal, which includes a functional and not strictly a physically comparison, since the analog converter signal and the digital converter signal normally cannot be directly compared with one another as physical signals, but rather an interpretation of the physical signals can be performed in order to create a common basis for such comparison.

In an exemplary embodiment of the invention, the evaluation unit determines a comparison value by comparing the analog converter signal with the digital converter signal and generating the electric output signal using the comparison value, based on the digital converter signal when a second comparison threshold value is not reached. Such novel design of the invention is based on the above-described knowledge so that, in the case of error-free function of the transducer, a deviation of the analog converter signal from the digital converter signal, outside of an error margin, can only exist when the input signal is quickly variable, or more exact, is varied so quickly that the digital transmission path cannot "follow" the input signal. As a converse argument, similar converter signals are then synonymous with only a slowly changing or stationary variable input signal, which is why the digital converter signal then has the advantage of higher accuracy compared with the analog converter signal. The digital converter signal is, thus, preferred in such a situation. The second comparison threshold value is preferably chosen smaller than the first comparison threshold value since, in that case, an overall hysteretic effect is achieved, and the transducer shows a stable output behavior using the value-based spacing of the converter thresholds.

In an exemplary embodiment of the transducer according to the invention, the evaluation unit determines, in turn, a comparison value by comparing the analog converter signal with the digital converter signal, wherein when a third comparison threshold value is exceeded by the comparison value, an alarm signal is generated, which preferably is output via a second output of the transducer. In such a transducer, the alarm signal is only generated when at least the analog converter signal or the digital converter signal has a rate of change below a predetermined lowest rate of change. Advantageously, such a novel design is ensures that the exceeding of the comparison threshold value is not caused by a transient event, such as a transient input signal, but rather that an error situation does, in fact, exist.

In this respect, it is provided by an exemplary embodiment of the transducer according to the invention that the evaluation unit determines the rate of change of the analog converter signal and/or of the digital converter signal and generates the electric output signal as a function of the determined value for the rate of change or, respectively, as a function of the determined values for the rates of change. For example, under the conditions of a quick analog transmission path, and a slow digital transmission path, it is advantageous that when the rate of change of the analog converter signal is determined and when the rate of change threshold value is not reached by the determined rate of change, the electric output signal is generated based on the analog converter signal.

The error safety or error detection in the transducer according to the invention can be increased in an exemplary embodiment, wherein the analog converter signal is supplied to the digital transmission path, a further comparison value is determined in the digital transmission path by comparing the analog converter signal with the digital converter signal, and the further comparison value is supplied to the evaluation unit. Advantageously, such a measure employs no additional circuitry when standard components are used for the digital transmission path. In addition, using the additionally determined further comparison value to determine an error in the evaluation unit, wherein the evaluation unit compares the further comparison value coming from the digital transmission path with the comparison value formed in the evaluation unit itself, provides a comparison-comparison value determined in this manner for diagnosing the transducer, such as for performing self-diagnosis. Such a novel design provides for an exceptionally economical variation for testing the evaluation unit.

In another variation of the transducer according to the invention, which also makes error detection possible, at least one further evaluation unit is provided. The additional evaluation unit provided can have the same functionality as the previously described evaluation unit, wherein both evaluation units mutually supply each other with the determined evaluation data (e.g., the determined comparison values, etc.) and, in this manner, an error-like behavior of at least one of the evaluation units can be determined when the evaluation data deviates from one evaluation unit to the other.

Based on the teachings of present invention, there numerous possibilities for designing and further developing a transducer according to the invention. In this respect, please refer to the appended claims, on the one hand and, on the other hand, to the following description of exemplary embodiments in connection with the drawings.

DETAILED DESCRIPTION OF THE INVENTION

Figure 1:
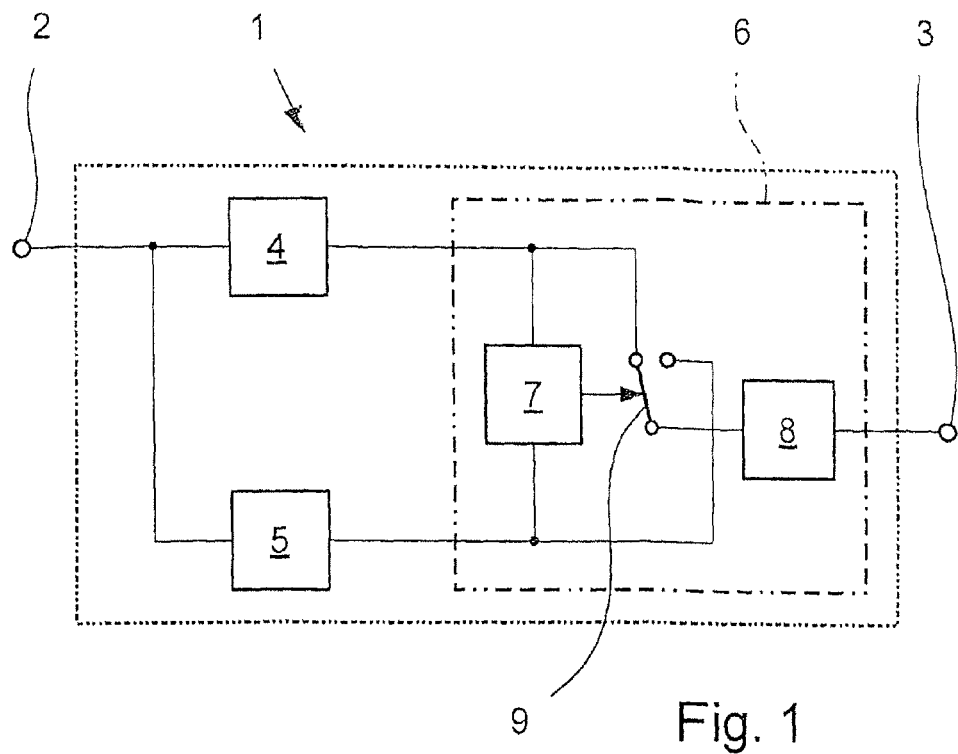
FIG. 1 is schematic representation of a transducer according to an exemplary embodiment of the invention.
Figure 2:
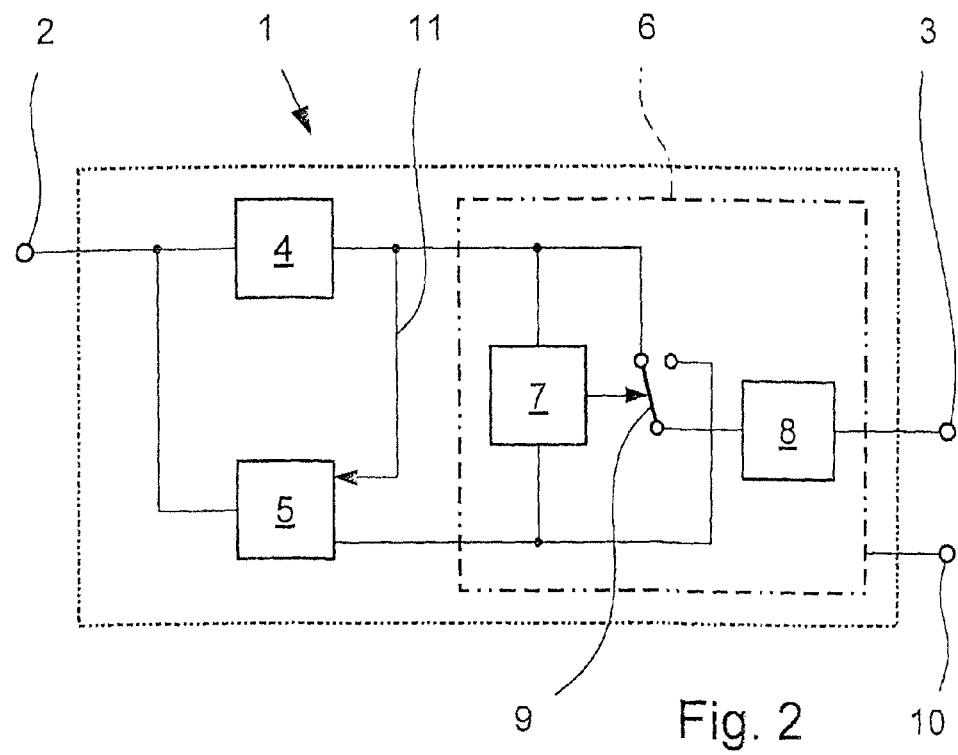
FIG. 2 is schematic representation of a further exemplary embodiment of a transducer according to the invention having a transmission of an analog converter signal in a digital transmission path.
Figure 3:
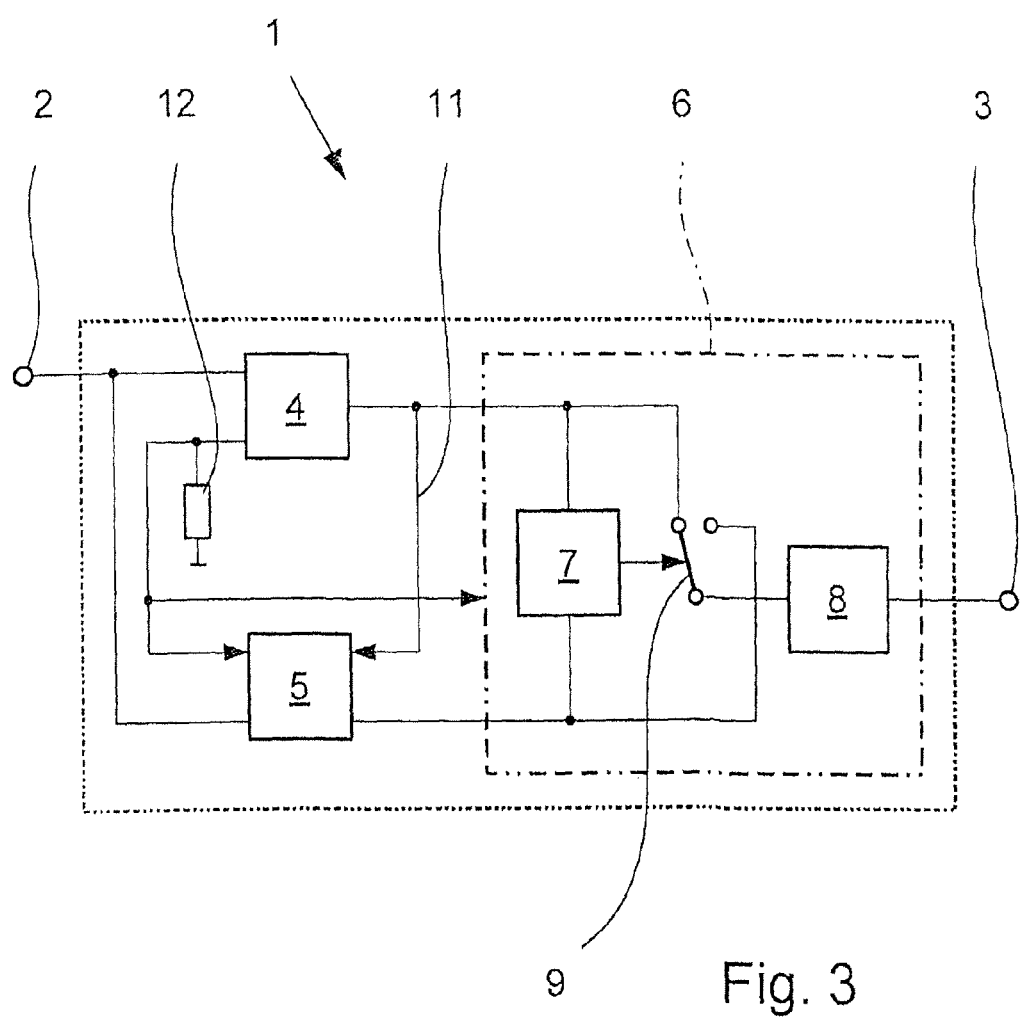
FIG. 3 is schematic representation of a further exemplary embodiment of a transducer according to the invention using an additional influencing variable to compensate for environmental influences.

The various exemplary embodiments of a transducer 1 shown in each of FIGS. 1-3, although not represented as electric circuit diagrams, provide functional influencing effects between the different components of the transducer 1, as will be appreciated by those of ordinary skill in the electrical arts.

In FIGS. 1-3, the depicted transducers 1 serve the purpose of converting an input signal fed to an input 2 into an electric output signal that can output via at least one output 3, wherein the input signal can be processed into an analog converter signal via an analog transmission path 4. In all depicted transducers 1, the input signal is additionally processed into a digital converter signal via a separate digital transmission path 5. The analog converter signal and the digital converter signal are then evaluated by an evaluation unit 6, and the evaluation unit 6 generates the electric output signal either based on the analog converter signal or based on the digital converter signal. If only a first input 2 and a first output 3 are depicted, then this representation is to be understood, in turn, as a schematic, wherein it is clear to a person of ordinary skill in the electrical arts, for example, that an electric voltage input signal can only be correctly identified in relation to a reference potential, which, however, is not shown in detail herein.

In the depicted embodiments, a comparator 7 is implemented in the evaluation unit 6, and which compares the analog converter signal and the digital converter signal with one another and, as a function of the comparison, supplies either the analog converter signal or the digital converter signal to the output 3 via a converter 8. The alternative use of either the analog converter signal or the digital converter signal is symbolized in FIGS. 1-3 by a switch 9, which implements the alternative use of both converter signals. How the switch 9 is technically implemented is of secondary importance and any suitable switching technologies can be employed. The evaluation unit 6 can be implemented in the embodiments of FIGS. 1-3, for example, as an integrated circuit, and the like.

The evaluation unit 6 compares the analog converter signal with the digital converter signal in the embodiments of FIGS. 1-3, and as a result, determines a comparison value, for example, based on the difference between both converter signals, wherein the converter signals are interpreted using any known devices before the comparison, since the digital converter signal and the analog converter signal can not be directly compared to one another presently on a physical signal level.

The evaluation unit 6 is given a first comparison threshold value, wherein if the comparison value exceeds this comparison threshold value, the electric output signal is generated based on the analog converter signal. This takes into account that a comparison value (e.g., a difference) of zero typically occurs when the input signal quickly changes, and thus, the differences due to the principles between the analog converter signal and the digital converter signal manifest themselves.

In the depicted transducers, the evaluation unit 6 determines a comparison value by comparing the analog converter signal with the digital converter signal, as described above, and when a comparison value does not reach a second given comparison threshold value, the electric output signal is generated based on the digital converter signal. In this case, the second comparison threshold value is smaller than the first comparison threshold value and, thus, a hysteretic effect is achieved (e.g., the output signal remains steady even with comparison values in the range of one of both comparison threshold values not using constant switching between analog converter signal and digital converter signal).

The evaluation unit 6 depicted in FIG. 2 is designed so that by comparing the analog converter signal with the digital converter signal, in turn, a comparison value is determined and when a third comparison threshold value is exceeded by the comparison value, an alarm signal is generated, wherein the alarm signal can be output via a second output 10 and can be picked up by a connected device.

In the transducer 1 depicted in FIG. 3, the evaluation unit 6 determines the rate of change of the analog converter signal, and as a function of the determined value, generates the electric output signal. The electric output signal is generated based on the analog converter signal and based on the determined rate of change of the analog converter signal exceeding a rate of change threshold value.

In the transducer 1 depicted in FIG. 2, an additional testing possibility for the functional ability of the evaluation unit 6 is provided, wherein the analog converter signal is supplied to the digital transmission path 6, symbolized by the signal path 11. Then, a further comparison value is determined in the digital transmission path 5 by comparing the analog converter signal with the digital converter signal and the further comparison value is supplied to the evaluation unit 6, wherein the evaluation unit 6 compares the further comparison value coming from the digital transmission path with the comparison value formed in the evaluation unit 6 itself and calls upon the comparison-comparison value determined in this manner for diagnosing the transducer, advantageously, providing self-diagnosis of the evaluation unit 6. Although not depicted in FIG. 2 by a separate signal path, the further comparison value is supplied to the evaluation unit 6 by the connection between the digital transmission path and the evaluation unit 6, which is a digital interface for transmitting any suitable type of digital information.

It is additionally depicted in FIG. 3 that in the analog transmission path 4 and in the digital transmission path 5, the value of an influencing variable employed for compensating environmental influences (e.g., temperature, etc.) is provided and used to compensate the analog converter signal and the digital converter signal. In this case, a temperature measuring resistor 12 is connected to the analog transmission path 4, and which is supplied by a constant current source (not shown) included in the analog transmission path 4. The voltage drop on the temperature measuring resistor 12 is used in the analog transmission path 4 as well as the digital transmission path for compensating any temperature influence, and the like. Moreover, in the transducer 1 according to FIG. 3, the evaluation unit 6 is provided the value of the influencing variable (e.g., the value of the temperature, etc.) used for compensating the temperature influence on the analog converter signal and the digital converter signal.

In all depicted embodiments, the output 3 can be implemented by a standardized output-current interface, and the like.

While the present inventions have been described in connection with a number of exemplary embodiments, and implementations, the present inventions are not so limited, but rather cover various modifications, and equivalent arrangements, which fall within the purview of the appended claims of the present invention

What is claimed is:

1. A transducer for converting an input signal to an electric output signal, the transducer comprising:
    a first input for receiving at least one input signal for conversion into an electric output signal;
    at least one first output for outputting the converted electric output signal;
    an analog transmission path for processing the input signal into an analog converter signal that is usable for generating an electric output signal;
    a separate digital transmission path for processing the input signal into a digital converter signal that is usable for generating an electric output signal; and
    an evaluation unit for evaluating the analog converter signal and the digital converter signal to generate the electric output signal based on either of the analog converter signal and the digital converter signal,
    said evaluation unit comprising a converter connected to said first output for generating said electric output signal, and
    said evaluation unit comprising a switch for alternatively supplying only said digital converter signal and only said analog converter signal to said converter.

2. The transducer of claim 1, wherein the evaluation unit determines a rate of change of the analog converter signal and/or of the digital converter signal and generates the electric output signal as a function of the determined value for the rate of change or as a function of the determined values for the rates of change, and wherein the rate of change of the analog converter signal is determined and when a rate of change threshold value is not reached by the determined rate of change of the analog converter signal, the electric output signal is generated based on the analog converter signal.

3. The transducer of claim 1, wherein in the analog transmission path and/or in the digital transmission path, the value of at least one influencing variable employed for compensating environmental influences is provided and used to compensate at least one of the analog converter signal and the digital converter signal.

4. The transducer of claim 3, wherein the evaluation unit is provided with at least one value of the influencing variable for compensating the environmental influences on at least one of the analog converter signal and the digital converter signal.

5. The transducer of claim 1, wherein the evaluation unit generates the electric output signal based on either of the analog converter signal and the digital converter signal by creating the electric output signal from either the analog converter signal or the digital converter signal.

6. The transducer of claim 1, wherein the evaluation unit generates the electric output signal based on either of the analog converter signal and the digital converter signal by switching between the analog converter signal and the digital converter signal.

* * * * *